United States Patent
Sakuta et al.

(10) Patent No.: US 7,502,636 B2
(45) Date of Patent: Mar. 10, 2009

(54) PORTABLE COMMUNICATION TERMINAL DEVICE FOR COMMUNICATION AND IMAGE DATA

(75) Inventors: Jun Sakuta, Kanagawa (JP); Ryosuke Takeuchi, Saitama (JP); Takeshi Matsuzawa, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 42 days.

(21) Appl. No.: 10/817,818

(22) Filed: Apr. 6, 2004

(65) Prior Publication Data

US 2004/0198460 A1    Oct. 7, 2004

(30) Foreign Application Priority Data

Apr. 7, 2003    (JP)    ............................. 2003-103319

(51) Int. Cl.
H04M 1/00    (2006.01)
H04B 1/38    (2006.01)

(52) U.S. Cl. .............. 455/575.1; 455/575.3; 455/575.4; 455/566; 455/556.1; 455/556.2; 455/550.1; 455/66.1; 455/90.3; 455/425; 345/156

(58) Field of Classification Search ... 455/575.1–575.4, 455/566, 556.1–556.2, 550.1, 573.3, 66.1, 455/90.3, 425; 348/14; 345/156
See application file for complete search history.

(56) References Cited

U.S. PATENT DOCUMENTS

| | | | | |
|---|---|---|---|---|
| 6,009,336 A | * | 12/1999 | Harris et al. | ................. 455/566 |
| 6,803,963 B2 | * | 10/2004 | Yamazaki et al. | ............ 348/375 |
| 7,003,318 B2 | * | 2/2006 | Kota et al. | ............... 455/556.1 |
| 7,058,295 B2 | * | 6/2006 | Nishiwaki | ................... 396/539 |
| 2002/0142810 A1 | * | 10/2002 | Kawasaki et al. | ........... 455/566 |
| 2003/0064758 A1 | * | 4/2003 | Mizuta et al. | ............... 455/566 |
| 2006/0104628 A1 | | 5/2006 | Hasegawa et al. | |

FOREIGN PATENT DOCUMENTS

EP    1 298 890    4/2003

(Continued)

*Primary Examiner*—Charles N Appiah
*Assistant Examiner*—Emem Stephen
(74) *Attorney, Agent, or Firm*—Oblon, Spivak, McClelland, Maier & Neustadt, P.C.

(57) ABSTRACT

Disclosed herein is a portable communication terminal wherein: an upper case is connected, at its lower end position, to a lower case so as to be slidable and rotatable about a shaft substantially perpendicular to a display screen of a display portion; the lower case has, on its inner main surface, a main operating portion equipped with various keys; and the display portion, even in a closed state of the upper case, is exposed; a shutter button is disposed on an outer side face of the lower case. The device is designed such that when the shutter button is depressed long in a closed state of the upper case, a shift is made to an imaging mode. The imaging mode allows a user to utilize the display screen of the display portion as a finder and to permit imaging in accordance with the user's operation of the shutter button. The device is also designed such that when the upper case is opened, the imaging operation is inhibited. This construction permits the display portion for communication to be utilized as a finder as well and also permits the device as an imaging function to serve in a way comparable to an ordinary camera.

13 Claims, 6 Drawing Sheets

FOREIGN PATENT DOCUMENTS

| | | |
|---|---|---|
| EP | 1 379 056 | 1/2004 |
| JP | 64-80145 | 3/1989 |
| JP | 10-98561 | 4/1998 |
| JP | 10-257460 | 9/1998 |
| JP | 10-336498 | 12/1998 |
| JP | 11-69214 | 3/1999 |
| JP | 2002-135380 | 5/2002 |
| JP | 2002-171189 | 6/2002 |
| JP | 2002-300237 | 10/2002 |
| JP | 2002-305566 | 10/2002 |
| JP | 2003-46610 | 2/2003 |
| JP | 2003-69869 | 3/2003 |
| JP | 2003-338857 | 11/2003 |
| JP | 2004-64138 | 2/2004 |
| JP | 2004-228767 | 8/2004 |
| JP | 2004-241939 | 8/2004 |
| WO | WO 01/84729 | 11/2001 |
| WO | WO 2004/066616 A1 | 8/2004 |

\* cited by examiner

F I G. 5
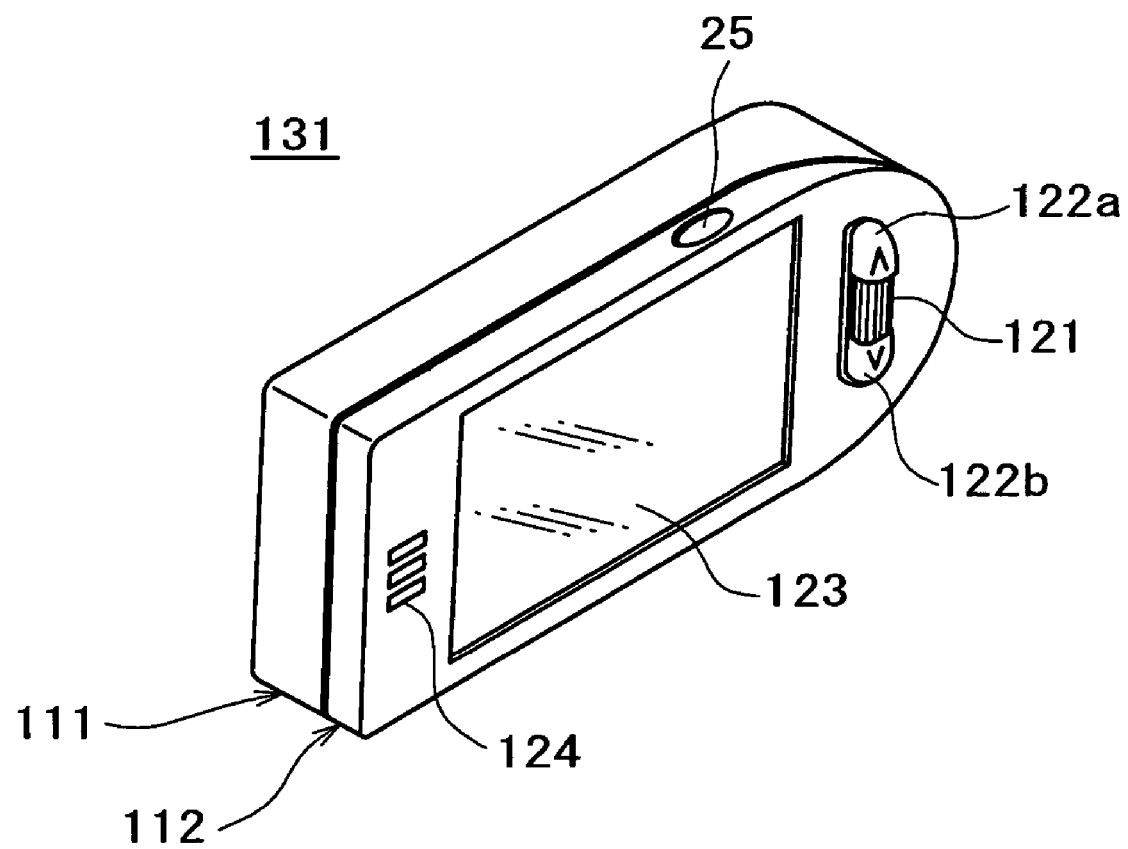

F I G. 7
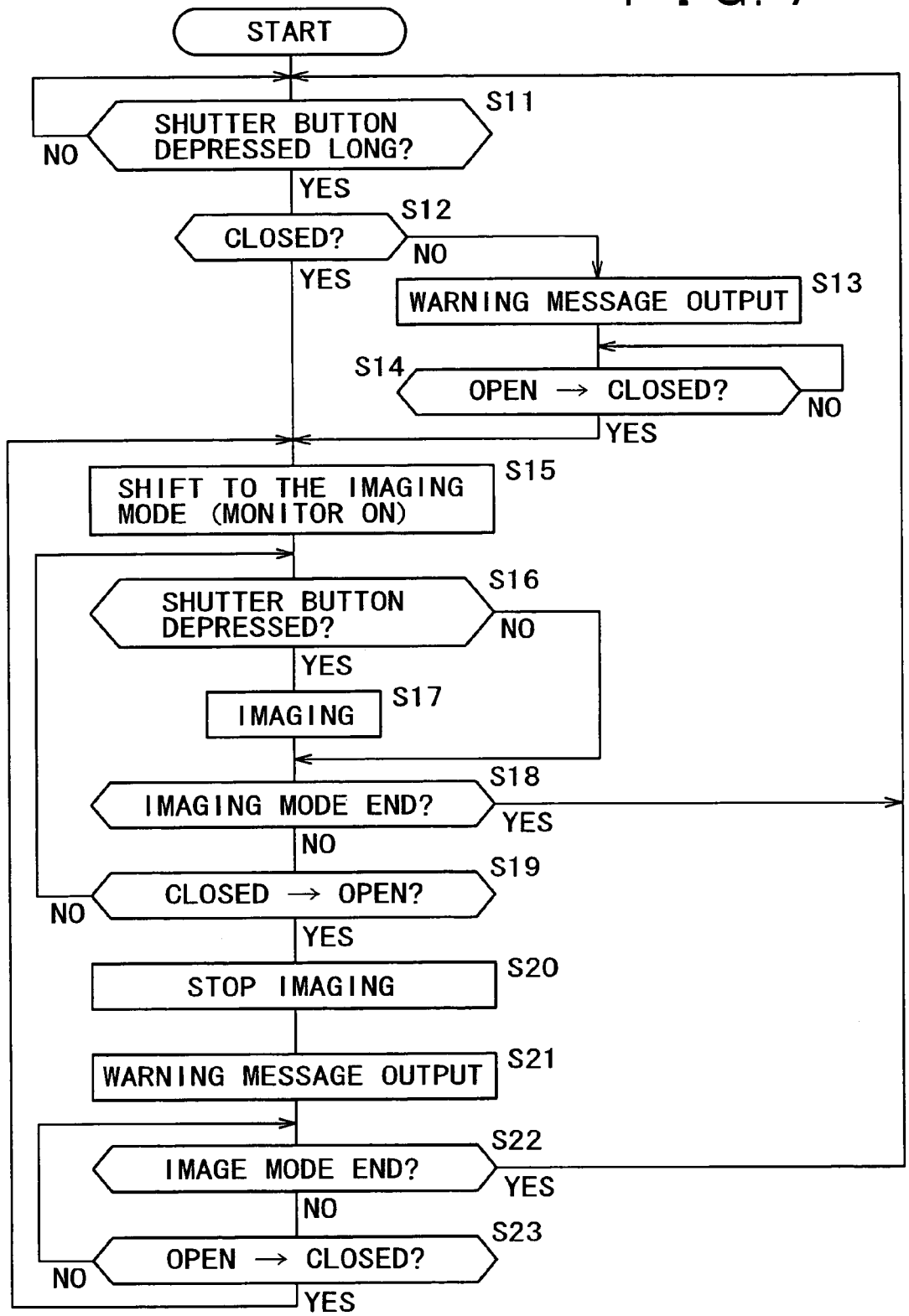

PORTABLE COMMUNICATION TERMINAL DEVICE FOR COMMUNICATION AND IMAGE DATA

BACKGROUND OF THE INVENTION

1. Field of the Invention

The present invention relates to a portable communication terminal device (portable communication terminal, hereinafter), in particular, relates to a folding type portable communication terminal with a digital camera as an imaging function. Specifically, the invention relates to a folding type portable communication terminal that has an upper case and a lower case and is designed such that the upper case is adapted to slide and rotate relative to the lower case.

2. Description of the Prior Art

A known portable communication terminal with an imaging function such as a portable telephone is disclosed in JP-A No. 336498/1998. This portable communication terminal is so designed as to utilize an LCD (liquid crystal display) for telephone use as a finder as well during imaging. Imaging is conducted such that: a user operates the terminal to display an image of an object in real time onto an LCD, check the state of display, and then conduct imaging. The portable communication terminal is equipped with a folding type upper case in which the LCD is disposed on an inner main surface of the upper case. Thus, when the LCD is utilized as a finder during imaging, the upper case is kept open relative to a lower case.

Further, for recent portable telephones available on the market, a folding type has been most popular, because of its user-friendly design where its display screen is large in size and yet small size when folded. The portable telephone generally has a sub-display portion on the outer surface of the upper case. The sub-display portion is utilized such that the state of radio wave, date and time, and received information can be checked-visually even in a closed state of the upper case.

A folding type portable telephone having a digital camera is constructed such that a shift is made to a camera mode by user's key operation in an open condition of the upper case and imaging can be done while utilizing a main display portion as a finder.

Opening and closing motions of the above conventional folding type portable communication terminal are similar to opening and closing motions of a bivalve. That is, the portable communication terminal opens and closes using a pivot shaft parallel to a lower-side side of the upper case (an upper-end side of the lower case). According to this construction, a main display portion which is utilized during communication and an operating portion which includes ten key, talk key, and clearing key, are disposed on inner main surfaces of the upper and lower cases, respectively. And when the cases are closed, the main display portion and the operating portion are hidden inside in a mutually opposed state. On such structural grounds, for utilizing the main display portion as a finder during imaging, it is necessary to use the portable communication terminal in an open condition of the upper case. This is different from the form and way of handling of an ordinary camera. Such a way of use gives a sense of incongruity to a user and the operationality of the terminal device is inferior.

When imaging is to be done using the conventional folding type portable communication terminal, it is required as a precondition that first the cases should be opened, next Camera Mode Key should be depressed for shift to a camera mode, and thereafter a finger of a user should be moved to a shutter button to start an imaging operation. Thus, a problem has been encountered in point of operationality also from the standpoint of quick imaging.

The portable communication terminal disclosed in the JP-A No. 3364981/1998 may carry out imaging even in a closed state of the upper case. However, the LCD cannot be utilized as a finder during imaging and therefore a dedicated finder is separately provided and is utilized. Such a separate provision of a dedicated finder causes an increase of cost.

SUMMARY OF THE INVENTION

Under the circumstances, the present invention aims to provide a portable communication terminal that allows a user to utilize the display portion for communication use as a finder during imaging as well, and that eliminates the need of a dedicated finder or a sub-display portion and at the same time obtains an improved usability comparable to an ordinary camera.

To achieve this, the invention provides a portable communication terminal with a digital camera, that is designed so as to open and close, not in such a bivalve fashion as described above but in a folding fashion, namely the terminal is folding type such as a slide/rotation type or a jackknife type.

Incidentally, the inventors of the invention have proposed the folding type in JP-A No. 2002-063635.

According to a primary aspect of the invention, a portable communication terminal which has an imaging function, comprises: a lower case having, on its main surface, an operating portion equipped with various keys; an upper case having, on its main surface, a display portion equipped with a display screen, said upper case being connected, at its lower end position, to said lower case so as to be slidable and rotatable about a shaft substantially perpendicular to the display screen; an imaging portion disposed on a back side of the operating portion of said lower case so as to face outward; an imaging button, disposed on an outer side face of either said upper case or said lower case, to allow instruction for imaging; and imaging control means which controls an imaging operation of said imaging portion while allowing a user to utilize the display screen of the display portion as a finder.

The portable communication terminal is constructed such that the upper and lower cases are adapted to slide and rotate at the connection of the two by a shaft substantially perpendicular to the display screen. In such a slide/rotation folding type, the display screen of the display portion is always exposed regardless of whether the cases are open or closed, permitting a user to see the whole of the display screen even in a closed state. This eliminates a sub-display portion, used in the prior art, for recognizing display information in a closed state of the cases. Besides, the display portion can be utilized as a finder during imaging in a closed state of the cases.

In the portable communication terminal of the primary aspect of the invention, upon receipt of an instruction for a shift to the imaging mode via a predetermined operation of said imaging button, said imaging control means prompts a user to utilize the display screen of the display portion as a finder, and then controls the imaging operation of said imaging portion in accordance with the user's operation of said imaging button. In the portable communication terminal of the invention, it is not necessary to open the cases during imaging. Therefore, in shifting to the imaging mode, utilizing the imaging button disposed on an outer side face permits a quick shift to the imaging mode without any open/close related operations.

According to the primary aspect of the invention, the portable communication terminal further comprises opening/closing detecting means for detecting opening or closing of said upper case relative to said lower case, wherein when said imaging control means, upon receipt of an instruction for a shift to the imaging mode, detects that said upper case is in an open state, it inhibits the shift to the imaging mode or the imaging operation of said imaging portion.

According to the primary aspect of the invention, the portable communication terminal further comprises opening/closing detecting means for detecting opening and closing of said upper case relative to said lower case, wherein when said imaging control means, engaged in shifting to the imaging mode, detects that said upper case is in an open state, it inhibits the imaging operation of said imaging portion.

These inhibiting operations function so as to guarantee the imaging operation in a conventional camera form with cases closed.

According to the invention, combining an imaging function with a slide/rotation folding type portable communication terminal allows a user to utilize the display portion for communication use as a finder during imaging. In addition, this enables the portable communication terminal to obtain usability comparable to an ordinary camera, improving its operationality. Also, this eliminates the need of a dedicated finder or a sub-display portion, permitting cost reduction of the device.

Shifting to the imaging mode by operation of the operating button in a closed state of the upper case permits a quick shift to the imaging mode while the cases are kept closed, thereby permitting an immediate shift to the imaging operation. During this period, unlike the prior art, it is not required for the user to open the cases and operate a key other than the imaging button to make a shift to the imaging mode or change the manner of holding the cases.

Further, if the imaging operation in an open condition of the cases is inhibited, any unnecessary image processing will not be performed and the occurrence of a malfunction will be prevented. This can guarantee the general way of use and operationality of the cameral.

Other and further objects, features and advantages of the invention will appear more fully from the following description.

BRIEF DESCRIPTION OF THE DRAWINGS

FIG. 5 is an appearance view of a portable communication terminal according to a modification of the embodiment, in which the position of a shutter button is changed from a position on the lower case in the embodiment to a position on the upper case;

FIG. 7 is a flowchart showing a first example of imaging operation in the portable communication terminal of the embodiment.

DETAILED DESCRIPTION OF THE PREFERRED EMBODIMENT

An embodiment of the invention will be described in detail hereinunder with reference to the accompanying drawings.

Figure 1:
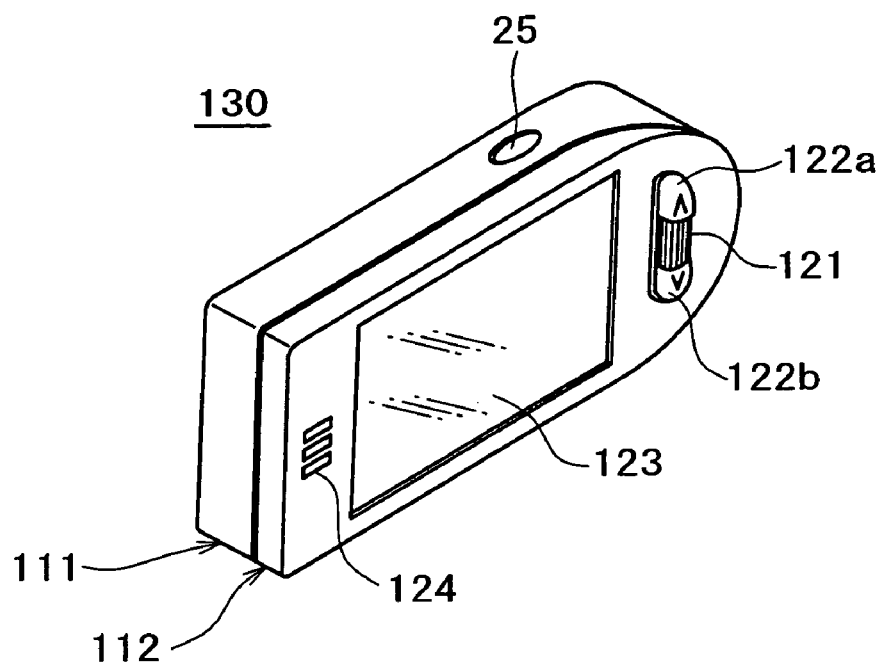
FIG. 1 is a first perspective view showing a folded state (closed state) of a slide/rotation type portable communication terminal according to an embodiment of the invention.
Figure 2:
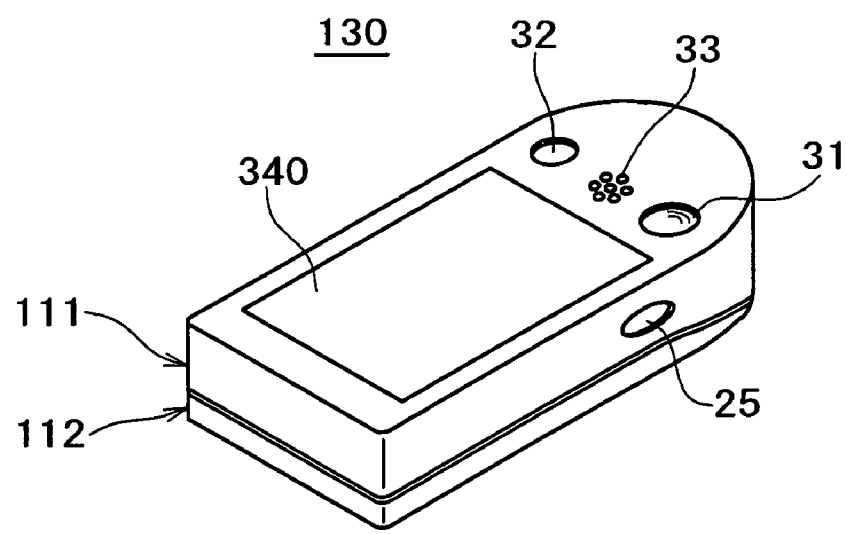
FIG. 2 is a second perspective view of the portable communication terminal of the embodiment as seen from a different viewpoint.

FIG. 1 is a first perspective view showing a folded state (closed state) of a slide/rotation folding type portable communication terminal according to an embodiment of the invention and FIG. 2 is a second perspective view of the portable communication terminal as seen from a different viewpoint.

As shown in FIG. 1, the portable communication device 130 is provided with a lower case 111 as a first case and an upper case (upper lid) 112. The upper case 112 has a display portion 123 on its inner main surface, the display portion 123 being constituted by such a flat display device as LCD for example. The upper case 112 is connected, at its end portion, to the lower case 111 so as to be slidable and rotatable by a shaft substantially perpendicular to a display screen of the display portion 123. The lower case 111 has, on its inner main surface, a main operating portion (invisible in FIGS. 1 and 2) as a first operating portion that has various keys. Even in a folded and superimposed state of both cases, the display portion 123 of the upper housing 112 is exposed because the type of this folding is not a bivalve type but a slide/rotation type.

On the same main surface of the upper case 112 where the display portion 123 is disposed, there are provided, as a sub-operating portion (a second operating portion), a jog dial 121 and operating buttons 122a, 122b. The jog dial is a rotary dial operation means that also serves as a push-button switch. Further, an ear receiver 124 is disposed near the display portion 123 on the main surface. On an outer side face of the lower case 111, there is disposed a shutter button 25 as an imaging button which instructs imaging.

When the right-hand portion of the portable communication terminal 130 shown in FIG. 1 is grasped by at least the right hand of a user in a sideways long state in which the jog dial 121 faces this right-hand side of the user (the display screen of the display portion 123 also faces this side), the shutter button 25 substantially assumes a position at which it is abutted against the back side of the tip of the right hand forefinger.

On the other hand, as shown in FIG. 2, a battery cover 340 is disposed on an outer main surface of the lower case 111, and sideways of the battery cover 340 there are disposed a lens 31, a mirror 32 and a speaker 33 in the imaging portion. The mirror 32 is to serve as an alternative to a finder when the user performs imaging while orienting the lens 31 toward him- or herself. However, a positional relation and sizes of the lens 31, mirror 32 and speaker 33 are not limited to those illustrated in the figure.

In the closed state of the cases, as shown in FIGS. 1 and 2, the display portion 123 is utilized as the finder screen and the shutter button 25 and the lens 31 are arranged in such a relation as illustrated in the figures, the portable communication terminal 130 has substantially the same form as the form of an existing digital camera and the user can perform imaging in the same way of handling as in the existing digital camera.

Figure 3:
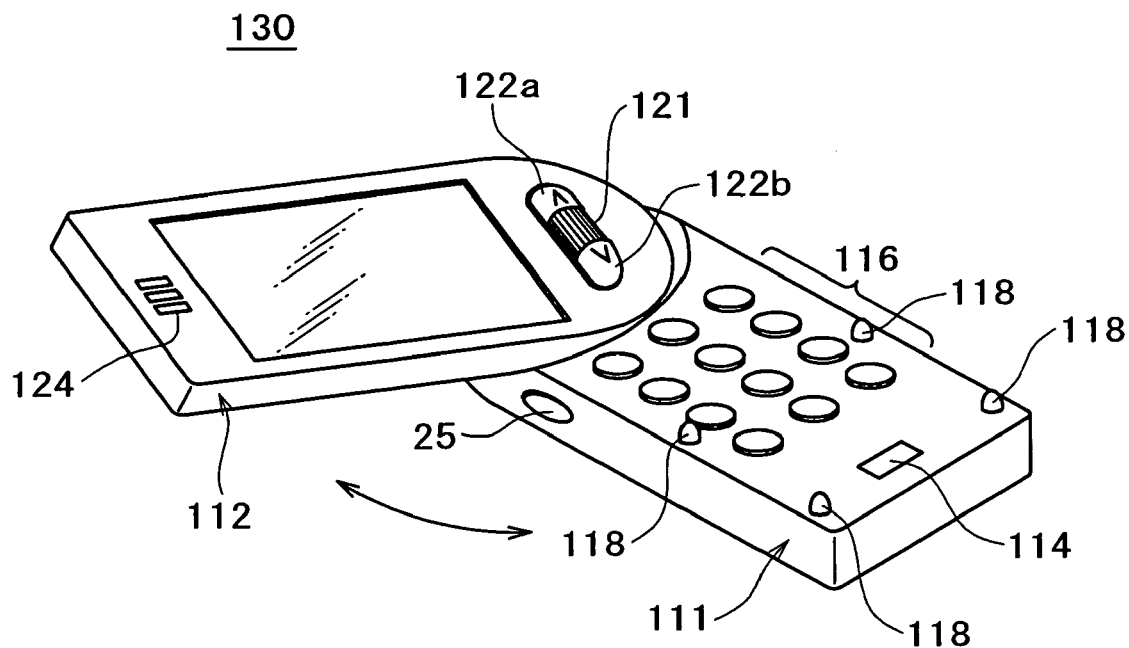
FIG. 3 is an appearance view showing a state in which an upper case is being opened by sliding and rotation relative to a lower case in the portable communication terminal of the embodiment.

FIG. 3 shows an appearance in a state in which the upper case 112 is being slid and rotated in its opening direction relative to the lower case 111 from the closed state of the portable communication terminal 130 illustrated in FIGS. 1 and 2. Although in FIG. 3 the upper case 112 is rotated in the clockwise direction, it can be rotated in both clockwise and counterclockwise directions.

Figure 4:
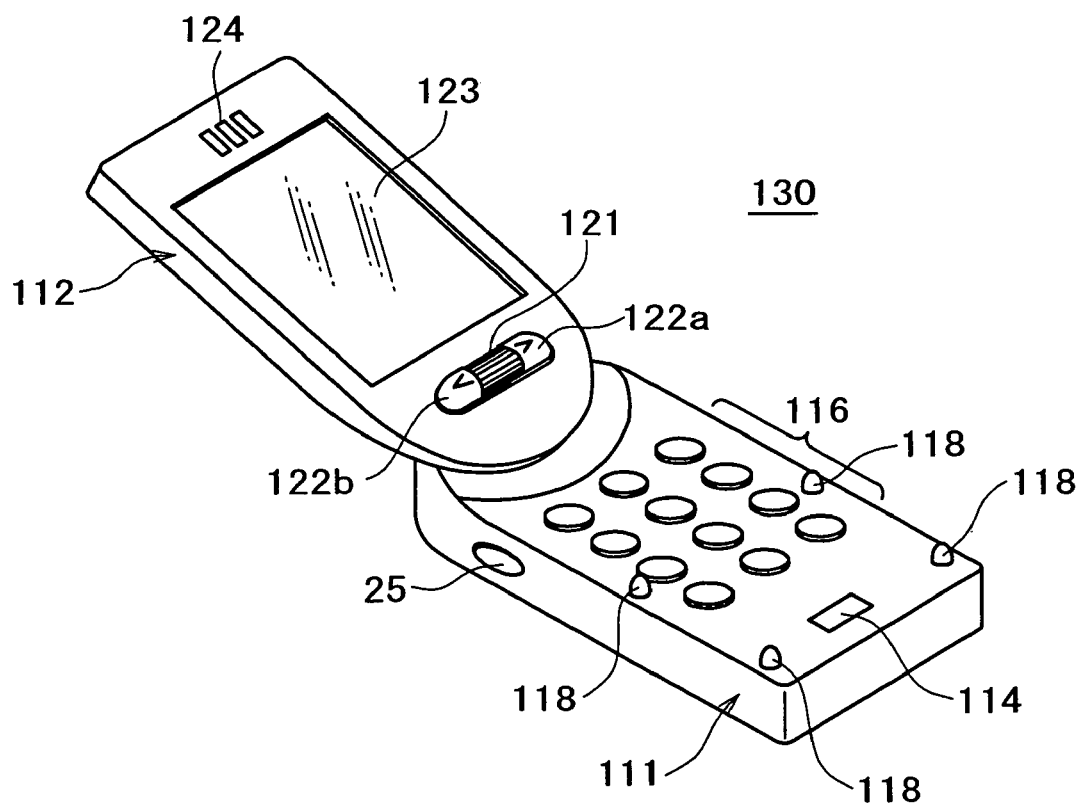
FIG. 4 is an appearance view showing a fully opened state of the upper case via the state of FIG. 3.

FIG. 4 shows a state in which the upper case 112 has been fully opened via the state of FIG. 3. In this embodiment, it is impossible to further rotate the upper case in the same direction from the open state of FIG. 4. By rotating the upper case in the direction opposite to its opening direction it is possible to make a return to the folded state. This is because a cable (not shown) for electric connection between the upper and lower cases extends through the connection of both cases and should be prevented from being twisted. Unless there arises such a problem as twisting of the cable, the upper case can be rotated in the same direction as its opening direction from the state illustrated in FIG. 4.

As shown in FIG. 4, a main operating portion 116 consisting of various keys, as well as a microphone 114, are disposed on the inner main surface of the lower case 111. Plural lugs 118 are formed at peripheral positions of the inner main surface of the lower case 111, serving as spacers for preventing the upper case 112 from depressing the keys of the main operating portion 116 erroneously when superimposed on the lower case. The lugs 118 are not essential to the invention. There may be adopted any other structure capable of preventing an erroneous depression of the keys of the main operating portion 116.

The open state of the upper case 112 shown in FIG. 4 is a utilization mode mainly for utilizing the main operating portion 116 such as voice call, preparation and transmission of an electronic mail and editing of an address book and a memo book.

Like the conventional bivalve folding type, the slide/rotation folding type portable communication terminal 130 is advantageous in that its size in a folded state can be reduced. The slide/rotation folding type is different from the bivalve folding type in the point that the display portion 123 is exposed even when both upper and lower cases are superimposed one on the other. In connection with the foregoing camera function, therefore, it is not necessary to provide a dedicated finder, nor is it necessary to provide a sub-display portion. As a result, in the folded state of the portable communication terminal it is possible to check the contents of a received electronic mail and thus the utility of the display portion 123 is improved.

FIG. 5 shows an appearance of a portable communication terminal 131 according to a modification of the above embodiment, in which the position of the shutter button 25 in the portable communication terminal 130 of FIG. 1 is changed from the lower case 111 to the upper case 112. An internal construction of the portable communication terminal 131 is the same as that of the portable communication terminal 130. There is no difference in operation between the two insofar as the imaging function is utilized in a closed state of the cases. However, in the case where the portable communication terminal is to be utilized for any other purpose than the imaging function in an open state of the cases, it is preferable that the shutter button 25 be provided on the lower case 111. Also from the standpoint of the length of wiring of such an electric switch as the shutter button 25, it can be said preferable that the shutter button 25 be positioned on the lower case 111 side in which a battery is accommodated.

Figure 6:
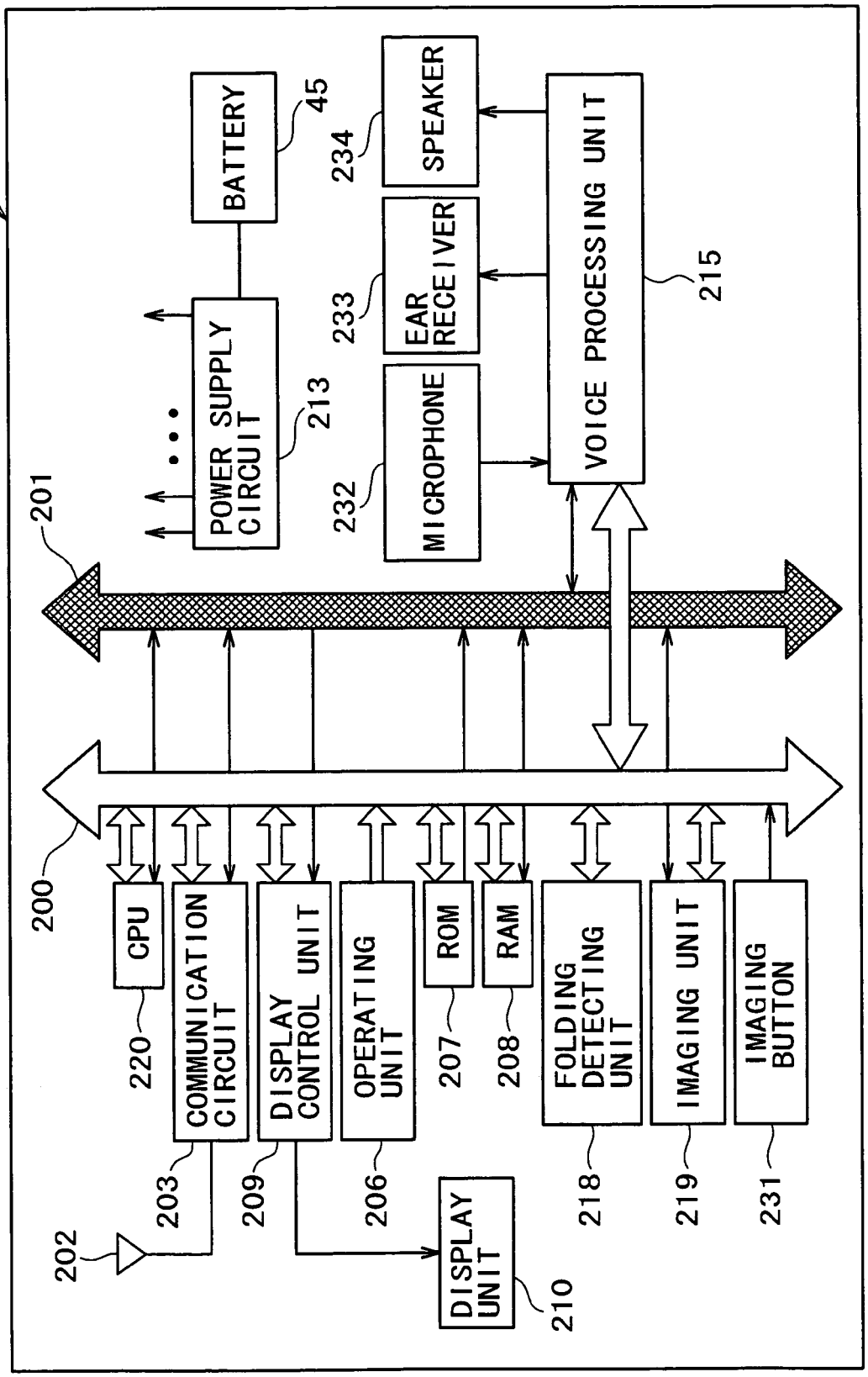
FIG. 6 is a block diagram showing a hardware configuration of the portable communication terminal of the embodiment.

FIG. 6 shows a hardware configuration of the portable communication terminal 130 of the above embodiment.

A CPU 220 controls the entire operation of the portable communication terminal 130. The CPU 220 is connected through a control line 200 to a communication circuit 203, a display control unit 209, an operating unit 206, a ROM 207, a RAM 208, a folding detecting unit 218, an imaging unit 219, an imaging button 231 (corresponding to 25 in FIG. 1), and a voice processing unit 215, and controls these components.

The communication circuit 203 takes charge of transmission and reception of information in the portable communication terminal and is connected by an antenna 202 to a base station through a radio interface. The display control unit 209 controls display in the display portion 210 (corresponding the display portion 123 in FIG. 1). The operating unit 206 (corresponding to the main operating portion 116 in FIG. 1) receives an input instruction from the user. The ROM 207 is a memory for storing fixed programs executed by the CPU 220 and associated fixed data (e.g., font data). The RAM 208 provides a temporary storage area of data to be used for operation of the CPU 220 and also provides a work area. The folding detecting unit 218 is known means for detecting whether the upper case is open or closed relative to the lower case. The imaging unit 219 performs an imaging process and is provided with, in addition to the lens 31 referred to above, an imaging element such as CCD and a control circuit for controlling the imaging element. The voice processing unit 215 is connected to a microphone 232 (corresponding to 114 in FIG. 1), an ear receiver 233 (corresponding to 124 in FIG. 1) and a speaker 234 (corresponding to 33 in FIG. 2) and takes charge of voice input and output.

A data line 201 is connected to the CPU 220, communication circuit 203, display control unit 209, ROM 207, RAM 208, voice processing unit 215 and imaging unit 219 and provides data transfer paths among them.

Usually, a chargeable battery 45 is loaded into the lower case 111 in a replaceable manner and there is provided a power supply circuit 213 that is connected to the battery 45 to supply each of the components of the device with a predetermined electric power.

FIG. 7 is a flowchart showing a first operation example related to imaging performed in the portable communication terminal of the embodiment. The illustrated processing is implemented by the execution with the CPU 220 of a computer program stored in the ROM 207.

In this embodiment, as an instruction given by the user for shift to the imaging mode (camera mode), there is adopted a predetermined operation of the shutter button 25 (e.g., a continuous depression of the button for a predetermined time or longer, i.e., a long depression). This is because the shutter button 25 is exposed in the folded state (closed state) of the cases and further because in the non-imaging mode there can be no erroneous imaging even by depression of the shutter button 25. Of course, since the second operating portion, including the jog dial, is also exposed in the folded state (closed state) of the cases, a menu operation can be done with the jog dial, or it is possible to utilize the operation of either the operating button 122a or 122b. However, in point of simplicity and easiness of understanding of operation, the use of the shutter button 25 is considered suitable for the shift-to-imaging mode instruction.

When a shift to the imaging mode has been instructed by the user, for example by a long depression of the shutter button 25, the CPU checks whether the cases are in a closed state or not (S12), and if the answer is affirmative, a shift is made to the imaging mode (S15). At this time, the display portion 123 is begun to be used as a finder for imaging. As a result, an image of an object obtained through the lens is displayed on the display screen of the display portion 123 approximately on a real time basis. On the other hand, if the cases are not closed (i.e., if they are open), a warning message calling for closing of the upper case is outputted and displayed on the display screen (S13). Alternatively, or simultaneously therewith, a predetermined warning sound or voice message may be uttered from the speaker and/or the ear receiver. After output of the warning message and upon closing of the upper case (S14), a shift is made to the imaging mode starts (S15).

When the shutter button is depressed after the shift to the imaging mode (S16), an imaging operation is executed (S17). If an instruction for end of the imaging mode is given (S18, No), the flow returns to the first step S11. The user gives the instruction for end of the imaging mode, more particularly, by operating for example the jog dial in the second operating portion. If the upper case is opened before issuance of the imaging mode end instruction (S19, Yes), the imaging is stopped (S20). Stopping the imaging means at least nullifying the depression of the shutter button. In addition, the monitoring function as a finder of the display portion may be turned OFF. Thereafter, the same warning message as in step S13 is outputted (S21).

The reasons why imaging is stopped in an open state of the cases is as follows.

(1) Since the portable communication terminal of this embodiment is a slide/rotation type, if imaging is allowed in an open state of the cases, a vertical interrelation of the display portion and the imaging portion reverses between open and closed states, so it becomes necessary to perform an extra processing such that a finder display image in the display portion should be turned upside down every time the cases are opened or closed.

(2) The operationality for imaging in an open state of the cases differs from that in a conventional camera, thus deteriorating user-friendliness.

(3) Usually, a function of terminating an arbitrary user's operation is allocated to a clearing key (a key in the operating unit 206) in a portable telephone and the operating portion is exposed in an open state of the cases, so there is a fear that the user may depress the clearing key by mistake to release the imaging mode at an unexpected time-point.

(4) Since the imaging operation can be done in a closed state of the cases while utilizing the display portion as a finder, there is no special reason for the need of imaging in an open state of the cases.

If an instruction for end of the imaging mode is given after step S21, the flow returns to the first step S11. This imaging mode end instruction is given by depressing a key (e.g., the clearing key) disposed in the main operating portion. Instead, operation of the second operating portion may be utilized. When the upper case 112 is closed again without issuance of any instruction for end of the imaging mode, the flow returns to step S15, i.e., the imaging mode.

Figure 8:
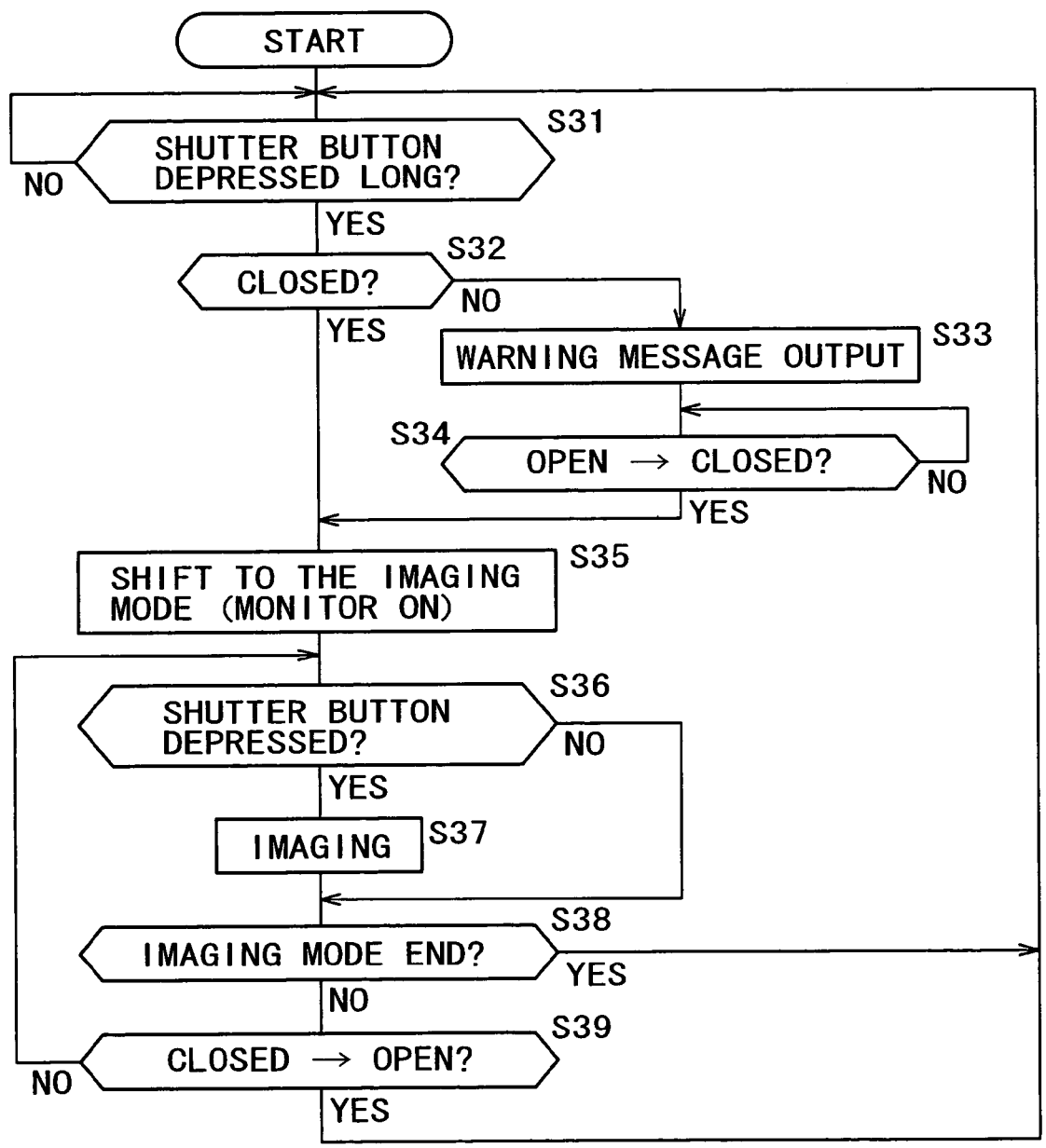
FIG. 8 is a flowchart showing a second example of imaging operation in the portable communication terminal of the embodiment.

FIG. 8 is a flowchart showing a second operation example related to imaging performed in the portable communication terminal of the embodiment. This operation example is similar to the first operation example shown in FIG. 7. Steps S31 to S39 in this second operation example are the same as steps S11 to S19 in FIG. 7. A difference resides in that the steps S20 to S23 in the first operation example are omitted in this second operation example. More specifically, in this second operation example, when the cases are opened after a shift to the imaging mode, the imaging mode is terminated. Therefore, for return to the imaging mode in this second operation example, it is necessary to close the cases and again depress the shutter button long.

The first operation example, as compared with the second operation example, is advantageous in that, after opening the cases to release the imaging mode, an immediate return to the imaging mode can be done by merely closing the cases. On the other hand, the second operation example is advantageous in that, when the imaging mode is to be released, this purpose can be achieved by merely opening the cases without operation of the first or the second operating portion.

Although a preferred embodiment of the invention has been described above, various modifications and changes may be made. For example, although in the operation examples of FIGS. 7 and 8 the shift to the imaging mode itself is stopped upon issuance of an instruction for shift to the imaging mode, there may be adopted a modification wherein a shift to the imaging mode is once made and the monitoring function as a finder of the display portion is turned ON, then when an open state of the cases is detected upon depression of the shutter button, the imaging operation is stopped. The imaging may cover not only static image but also dynamic image. Further, the position of the shutter button is not limited to the illustrated positions.

The foregoing invention has been described in terms of preferred embodiments. However, those skilled, in the art will recognize that many variations of such embodiments exist. Such variations are intended to be within the scope of the present invention and the appended claims.

What is claimed is:

1. A portable communication terminal having an imaging function, comprising:

a lower case having, on its main surface, an operating portion equipped with various keys;

an upper case having, on its main surface, a display portion equipped with a graphics display screen and not including a second graphics display screen, said upper case being connected, at its lower end position, to said lower case so as to be slidable and rotatable about a shaft substantially perpendicular to the graphics display screen;

an imaging portion including a lens disposed on a back side of the operating portion of said lower case so as to face outward;

an imaging button, disposed on an outer side face of either said upper case or said lower case, to allow instruction for imaging;

imaging control means which controls an imaging operation of said imaging portion while allowing a user to utilize the graphics display screen of the display portion as a finder; and an opening/closing detecting means for detecting opening or closing of said upper case relative to said lower case, wherein when said imaging control means detects that said upper case is an open state upon receipt of an instruction for a shift to the imaging mode, the imaging control means inhibits the shift to the imaging mode or the imaging operation of said imaging portion.

2. A portable communication terminal according to claim 1, wherein upon receipt of an instruction for a shift to the imaging mode via a predetermined operation of said imaging button, said imaging control means prompts a user to utilize the graphics display screen of the display portion as a finder, and then controls the imaging operation of said imaging portion in accordance with the user's operation of said imaging button.

3. A portable communication terminal according to claim 1, wherein when said imaging control means, engaged in shifting to the imaging mode, detects that said upper case is in an open state, inhibits the imaging operation of said imaging portion.

4. A portable communication terminal according to claim 1, wherein when said upper case has changed from the open state to a closed state, said imaging control means cancels the inhibition of the imaging operation.

5. A portable communication terminal according to claim 3, wherein when the state of said upper case has changed from the open state to a closed state, said imaging control means cancels the imaging operation.

6. A portable communication terminal according to claim 1, wherein, at the time of inhibiting the imaging operation, said imaging control means prompts the display portion to display a warning message calling for closing of said upper case.

7. A portable communication terminal according to claim 3, wherein, at the time of inhibiting the imaging operation, said imaging control means causes the display portion to display a warning message calling for closing of said upper case.

8. A portable communication terminal according to claim 1, wherein when said upper case is detected to be in an open state in the imaging mode, said imaging control means releases the imaging mode.

9. A portable communication terminal according to claim 1, further comprising:
a second operating portion disposed on the main surface of said upper case, wherein
said imaging control means, while in the imaging mode, releases the imaging mode in accordance with the operation of said second operating portion.

10. A portable communication terminal according to claim 9, wherein said second operating portion has rotary dial operating means.

11. A portable communication terminal according to claim 1, wherein said imaging button is disposed on an outer side face of said lower case.

12. A portable communication terminal having an imaging function, comprising:
a lower case having, on its main surface, an operating portion equipped with various keys;
an upper case having a display portion equipped with a graphics display screen and not including a second graphics display screen, the display portion being disposed so as to be exposed, said upper case being connected, at its lower end position, to said lower case so as to be slidable and rotatable about a shaft substantially perpendicular to the graphics display screen;
an imaging portion including a lens disposed on a back side of the operating portion of said lower case so as to face outward;
an imaging button disposed on a side face of either said upper case or said lower case to allow instruction for imaging;
a CPU that controls an imaging operation of said imaging portion while allowing a user to utilize the graphics display screen of the display portion as a finder; and
an opening/closing detecting means for detecting opening or closing of said upper case relative to said lower case, wherein
when said imaging control means detects that said upper case is in an open state upon receipt of an instruction for a shift to the imaging mode, the imaging control means inhibits the shift to the imaging mode or the imaging operation of said imaging portion.

13. A portable communication terminal having an imaging function, comprising:
a lower case having, on its main surface, an operating portion equipped with various keys;
an upper case having a display portion having a graphics display screen and not including a second graphics display screen, the display portion being disposed so as to be exposed, said upper case being connected, at its lower position, to said lower case so as to be slidable and rotatable about a shaft substantially perpendicular to the graphics display screen;
a folding detecting portion for detecting opening or closing of said upper case relative to said lower case;
an imaging portion including a lens disposed on a back side of the operating portion of said lower case so as to face outward;
an imaging button disposed on a side face of either said upper case or said lower case so as to allow instruction for imaging;
a CPU that, on the basis of a detection result provided from said folding detecting portion, controls an imaging operation of said imaging portion while allowing a user to utilize the display portion; and
an opening/closing detecting means for detecting opening or closing of said upper case relative to said lower case, wherein when said imaging control means detects that said upper case is in an open state upon receipt of an instruction for a shift to the imaging mode, the imaging control means inhibits the shift to the imaging mode or the imaging operation of said imaging portion.

* * * * *